(12) United States Patent
Lee et al.

(10) Patent No.: US 9,959,460 B2
(45) Date of Patent: May 1, 2018

(54) RE-WANDERING ALARM SYSTEM AND METHOD

(71) Applicant: Hanwha Techwin Co., Ltd., Changwon-si (KR)

(72) Inventors: Hwalsuk Lee, Changwon-si (KR); Shimin Yin, Changwon-si (KR); JuHyeong Park, Changwon-si (KR)

(73) Assignee: HANWHA TECHWIN CO., LTD., Changwon-si (KR)

( * ) Notice: Subject to any disclaimer, the term of this patent is extended or adjusted under 35 U.S.C. 154(b) by 78 days.

(21) Appl. No.: 15/130,218

(22) Filed: Apr. 15, 2016

(65) Prior Publication Data

US 2017/0018091 A1 Jan. 19, 2017

(30) Foreign Application Priority Data

Jul. 16, 2015 (KR) ........................ 10-2015-0101112

(51) Int. Cl.
*G06K 9/00* (2006.01)
(52) U.S. Cl.
CPC ................................ *G06K 9/00348* (2013.01)
(58) Field of Classification Search
CPC ........... G06K 9/00342; G06K 9/00771; H04N 5/23219; H04N 5/23296
See application file for complete search history.

(56) References Cited

U.S. PATENT DOCUMENTS

| 7,433,493 | B1* | 10/2008 | Miyoshi | G06K 9/00771 348/E7.087 |
| 7,860,162 | B2* | 12/2010 | Yokomitsu | G06T 7/246 348/699 |
| 8,965,050 | B2* | 2/2015 | Yoshimitsu | G06K 9/00771 382/103 |
| 2006/0120564 | A1* | 6/2006 | Imagawa | G06K 9/00335 382/103 |
| 2009/0276705 | A1* | 11/2009 | Ozdemir | G06K 9/00335 715/708 |
| 2010/0124358 | A1* | 5/2010 | Huang | G06K 9/00342 382/103 |
| 2012/0274781 | A1* | 11/2012 | Shet | G06K 9/6857 348/169 |
| 2013/0242093 | A1* | 9/2013 | Cobb | H04N 7/002 348/143 |

(Continued)

FOREIGN PATENT DOCUMENTS

JP 2004-266623 A 9/2004
KR 10-2001-0016315 A 3/2001
(Continued)

*Primary Examiner* — Bhavesh Mehta
*Assistant Examiner* — Ian Lemieux
(74) *Attorney, Agent, or Firm* — Ladas & Parry LLP

(57) ABSTRACT

Provided are a re-wandering detecting device and method. The method includes: detecting an object and positional information about the object from an input image; determining whether the object wanders based on the positional information about the object; in response to determining that the object wanders, determining whether the object re-wanders by determining whether a database stores information about an object identical to the object detected from the input image; and providing information about wandering of the object according to whether the object re-wanders.

20 Claims, 14 Drawing Sheets

(56) References Cited

U.S. PATENT DOCUMENTS

| | | | | |
|---|---|---|---|---|
| 2013/0243252 A1* | 9/2013 | Xu | .................. | H04N 7/002 |
| | | | | 382/103 |
| 2014/0313330 A1* | 10/2014 | Carey | ............... | G06K 9/00771 |
| | | | | 348/143 |
| 2015/0071492 A1* | 3/2015 | Barr | ................ | G06N 7/005 |
| | | | | 382/103 |
| 2016/0118080 A1* | 4/2016 | Chen | ................ | G11B 27/28 |
| | | | | 386/344 |

FOREIGN PATENT DOCUMENTS

| | | |
|---|---|---|
| KR | 10-1470315 B1 | 12/2014 |
| KR | 10-2015-0021349 A | 3/2015 |

\* cited by examiner

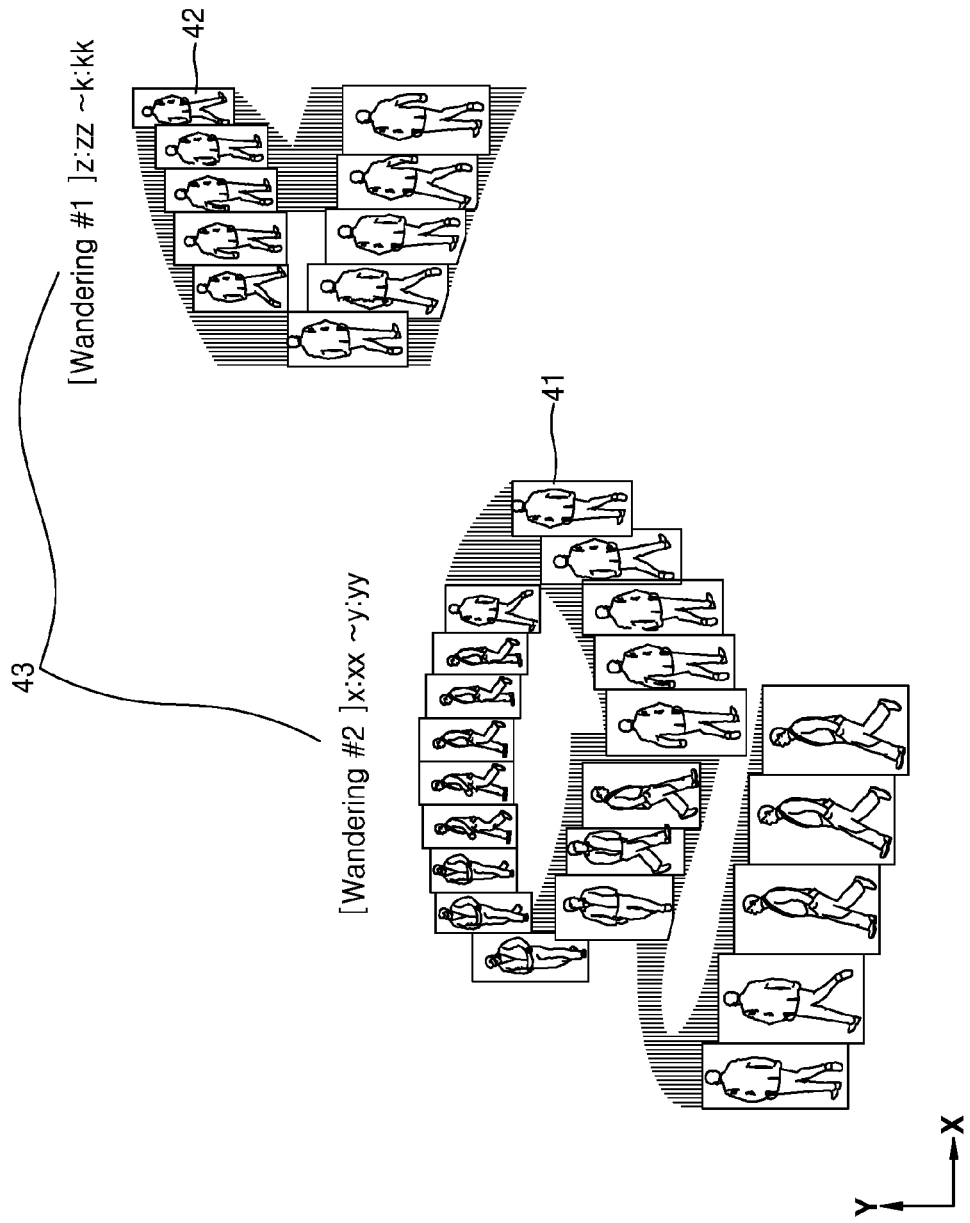

RE-WANDERING ALARM SYSTEM AND METHOD

CROSS-REFERENCE TO THE RELATED APPLICATION

This application claims priority from Korean Patent Application No. 10-2015-0101112, filed on Jul. 16, 2015, in the Korean Intellectual Property Office, the disclosure of which is incorporated herein in its entirety by reference.

BACKGROUND

1. Field

Exemplary embodiments relate to a system and method for detecting a wandering object and providing information about the wandering object differently according to the number of times of the wandering by the object.

2. Description of the Related Art

Nowadays, since surveillance cameras are installed everywhere, most criminals look around a target place before committing a crime. Therefore, it is necessary to consider wandering people as suspicious people and carefully monitor them. However, it is practically difficult to monitor all wandering people with existing surveillance equipment and manpower. Therefore, there is a need for an alarm system configured to detect a person wandering around a particular area for a certain period of time or longer or re-wandering around the particular area, and to warn a user about the person.

SUMMARY

Exemplary embodiments of the inventive concept provide a system and method for detecting a wandering object, extracting reference characteristics of the object, and providing information about the object on a screen differently according to the number of times of wandering by the object.

Various aspects of the inventive concept will be set forth in part in the description which follows and, in part, will be apparent from the description, or may be learned by practice of the presented exemplary embodiments.

According to one or more embodiments, there is provided a method of detecting re-wandering. The method may include: detecting an object and positional information about the object from an input image; determining whether the object wanders based on the positional information about the object; in response to determining that the object wanders, determining whether the object re-wanders by determining whether a database stores information about an object identical to the object detected from the input image; and providing information about wandering of the object according to whether the object re-wanders.

The input image may be a motion picture including a plurality of frames, the detecting the object may include detecting the object and positional information about the object from each of the plurality of frames, and in the determining whether the object wanders, the object may be determined as a wandering object if the object satisfies a preset wandering condition.

The wandering condition may be that the number of consecutive frames from which the object is detected is equal to or greater than a preset critical number.

The wandering condition may be that at least one closed curve is formed by a path of the object calculated using the positional information about the object.

The detecting the object may include detecting the object and positional information about the object from each of the plurality of frames and detecting reference characteristics of the object from at least one of the plurality of frames, wherein the determining whether the object re-wanders may include: searching the database to determine whether the database stores information about an object having the same reference characteristics as the detected reference characteristics of the object and determine that the object re-wanders if the database stores the information about the object having the same reference characteristics as the detected reference characteristics; in response to determining that the object re-wanders, storing images of the object respectively detected from the plurality of frames in the database; and in response to determining that the object does not re-wander, storing the detected reference characteristics of the object and the images of the object respectively detected from the plurality of frames in the database.

The detecting the object may include detecting box images of the object and positional information about the box images respectively from the plurality of frames and detecting reference characteristics of the box images from at least one of the plurality of frames, and in response to determining that the database does not store the information about the object having the same reference characteristics as the detected reference characteristics of the box images, the reference characteristics of the box images and all the box images respectively detected from the plurality of frames may be stored in the database.

The reference characteristics of the object may include clothing characteristics, face characteristics, gait characteristics, or a combination thereof.

The providing the information may include: if it is determined that the object wanders, providing primary information about the wandering of the object by arranging all images of the object detected in the detecting of the object in a single screen with reference to the positional information about the object; and if it is determined that the object re-wanders in the determining whether the object re-wanders, providing secondary information about the re-wandering of the object by selecting other images of the object stored in the database than the images provided in the providing the primary information and arranging the selected images in the single screen together with the information provided in the providing the primary information with reference to positional information about the object in the selected images.

The detecting the object may include detecting box images of the object and positional information about the box images respectively from the plurality of frames, wherein the database may previously store box images of each of a plurality of objects and positional information about the box images of the objects, wherein the providing the primary information may include providing information about the wandering of the object by arranging all the box images of the object detected in the detecting the object in the single screen with reference to the positional information about the object in the box images, and the providing the secondary information may include providing information about the re-wandering of the object by selecting other box images of the object stored in the database than the box images provided in the providing the primary information and arranging the selected box images in the single screen together with the information provided in the providing the primary information with reference to positional information about the object in the selected box images.

If it is determined that the object re-wanders in the determining whether the object re-wanders, the providing the information may include displaying all images of the object stored in the database in a screen one by one in a time sequence with reference to information about the images of the object and a position of the object stored in the database.

According to one or more embodiments, there is provided a re-wandering detecting device which may include: an object detector configured to detect an object and positional information about the object from an input image; a wandering determiner configured to determine whether the object wanders based on the positional information about the object; a re-wandering determiner, in response to determining by the wandering determiner that the object wanders, determiner configured to determine whether the object re-wanders by determining whether a database stores information about an object identical to the object detected from the input image; and an information provider configured to provide information about wandering of the object according to whether the object re-wanders.

The input image may be a motion picture including a plurality of frames, the object detector may detect the object and positional information about the object from each of the plurality of frames, and if the object detected by the object detector satisfies a preset wandering condition, the wandering determiner may determine that the object wanders.

The wandering condition may be that the number of consecutive frames from which the object is detected is equal to or greater than a preset critical number.

The wandering condition may be that at least one closed curve is formed by a path of the object calculated using the positional information about the object.

The object detector may detect the object and positional information about the object from each of the plurality of frames and detects reference characteristics of the object from at least one of the plurality of frames, wherein the re-wandering determiner may include: a first determiner configured to search the database for the detected reference characteristics and determine whether the database stores information about an object having the same reference characteristics as the detected reference characteristics of the object; a second determiner configured to determine the object as a re-wandering object in response to determining by the first determiner that the database stores the object having the same reference characteristics as the detected reference characteristics of the object; and a data storage, in response to determining by the second determiner that the object is a re-wandering object, configured to store images of the object respectively detected from the plurality of frames in the database, and, in response to determining by the second determiner that the object is not the re-wandering object, configured to store the reference characteristics of the object and the images of the object respectively detected from the plurality of frames in the database.

The object detector may detect box images of the object and positional information about the box images respectively from the plurality of frames and detects reference characteristics of the box images from at least one of the plurality of frames, and if the database does not store the information about the object having the same reference characteristics as the detected reference characteristics of the box images, the data storage may store the reference characteristics of the box images and all the box images respectively detected from the plurality of frames in the database.

The reference characteristics of the object may include clothing characteristics, face characteristics, gait characteristics, or a combination thereof.

The object detector may detect the object and positional information about the object from each of the plurality of frames, wherein the information provider may include: a first information provider, in response to determining by the wandering determiner that the object wanders, configured to provide information about the wandering of the object by arranging all images of the object detected by the object detector in a single screen with reference to the positional information about the object; and a second information provider, in response to determining by the re-wandering determiner that the object re-wanders, configured to provide information about the re-wandering of the object by selecting other images of the object stored in the database than the images provided by the first information provider and arranging the selected images in the single screen together with the information provided by the first information provider with reference to positional information about the object in the selected images.

The object detector may detect box images of the object and positional information about the box images respectively from the plurality of frames, wherein the database may previously store box images of each of a plurality of objects and positional information about the box images, the first information provider may provide information about the wandering of the object by arranging all the box images of the object detected by the object detector in the single screen with reference to the positional information about the object in the box images, and the second information provider may provide information about the re-wandering of the object by selecting other box images of the object stored in the database than the box images provided by the first information provider and arranging the selected box images in the single screen together with the information provided by the first information provider with reference to positional information about the object in the selected box images.

Other aspects will become apparent and more readily appreciated from the accompanying drawings, claims, and detailed description.

BRIEF DESCRIPTION OF THE DRAWINGS

These and/or other aspects will become apparent and more readily appreciated from the following description of the exemplary embodiments, taken in conjunction with the accompanying drawings in which:

FIGS. 8 and 9 are views illustrating examples of a screen through which an information provider provides information about wandering;

DETAILED DESCRIPTION OF THE EXEMPLARY EMBODIMENTS

Figure 1:
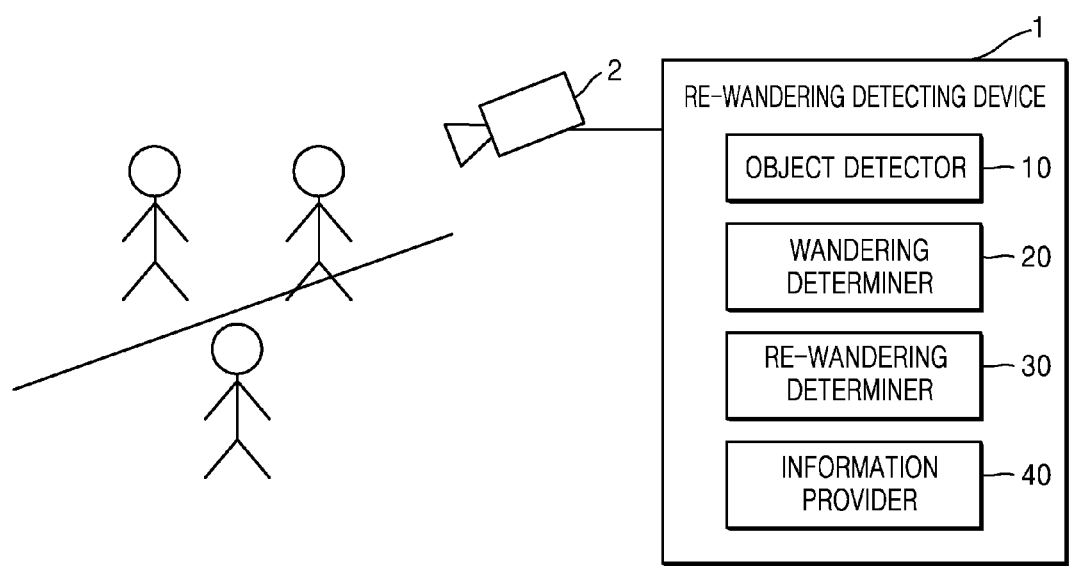
FIG. 1 is a view illustrating a re-wandering detecting system, according to an exemplary embodiment.

Reference will now be made in detail to exemplary embodiments which are illustrated in the accompanying drawings, wherein like reference numerals refer to like elements throughout. In this regard, the presented exemplary embodiments may have different forms and should not be construed as being limited to the descriptions set forth herein. Accordingly, the exemplary embodiments are merely described below, by referring to the figures, to explain aspects of the inventive concept. As used herein, the term "and/or" includes any and all combinations of one or more of the associated listed. Expressions such as "at least one of," when preceding a list of elements, modify the entire list of elements and do not modify the individual elements of the list. Moreover, detailed descriptions related to well-known functions or configurations will be ruled out in order not to unnecessarily obscure subject matters of the exemplary embodiments.

It will be understood that although the terms "first" and "second" are used herein to describe various elements, these elements should not be limited by these terms. Terms are only used to distinguish one element from other elements.

In the following description, the technical terms are used only for explaining a specific exemplary embodiment while not limiting the inventive concept. The terms of a singular form may include plural forms unless referred to the contrary. The meaning of 'include' or 'comprise' specifies a property, a fixed number, a step, a process, an element, a component, and a combination thereof but does not exclude other properties, fixed numbers, steps, processes, elements, components, and combinations thereof.

The exemplary embodiments may be embodied as functional blocks and various processing operations as illustrated in the accompanying drawings. The functional blocks may be implemented with various hardware and/or software configurations executing specific functions. For example, the exemplary embodiments may employ integrated circuit configurations such as a memory, processing, logic, a look-up table and the like capable of executing various functions upon control of microprocessors or other control devices. In a similar manner to that in which the elements of the embodiments may be executed with software programming or software elements, the embodiments may be implemented with a scripting language or a programming language such as C, C++, Java, assembler, and the like, including various algorithms implemented by a combination of data structures, processes, processes, routines or other programming configurations. The functional aspects may be implemented by algorithms executed in one or more processors. Also, the exemplary embodiments may employ conversional arts to establish an electronic environment, process signals and/or process data. Terms such as "mechanism," "element," "means," and "configuration" may be widely used and are not limited to mechanical and physical configurations. Such terms may have the meaning of a series of routines of software in association with a processor or the like.

The term "re-wandering" is used herein to describe a situation in which an object having wandered around a particular area at least once wanders again around the particular area.

Wandering alarms of the related art are configured to measure a time period during which an object stays within a field of view (FOV) of a camera in a predetermined area and determine whether the object wanders in the area based on the measured time period. That is, if the object stays within the FOV of the camera in the area for a critical time period or longer, it is determined that the object wanders. In this case, however, when the object having wandered before re-wanders, the re-wandering is not detected. Moreover, the re-wandering may be detected as wandering of another object. Therefore, it is difficult to carry out precise surveillance or monitoring.

However, according to an exemplary embodiment, a re-wandering detecting system detects both wandering and re-wandering of an object. In addition, if it is determined that an object re-wanders, information about previous wandering of the object is also provided to a user, and thus surveillance or monitoring may be carried out more efficiently.

FIG. 1 is a view illustrating a re-wandering detecting system according to an exemplary embodiment.

Referring to FIG. 1, the re-wandering detecting system includes a re-wandering detecting device 1 and an image acquisition device 2.

The image acquisition device 2 may photograph surrounding areas, scenes (spaces), or various objects (for example, stationary objects such as floors, walls, or obstacles, or moving objects such as persons or animals) included in the scenes. The image acquisition device 2 may be a device such as a camera including an image sensor. The image acquisition device 2 may be connected to the re-wandering detecting device 1 by a wired or wireless communication scheme.

Referring to FIG. 1, the re-wandering detecting device 1 may include an object detector 10, a wandering determiner 20, a re-wandering determiner 30, and an information provider 40. The object detector 10 detects objects and information about the positions of the objects. The wandering determiner 20 uses information about the position of a detected object to determine whether the object wanders. If it is determined that the detected object wanders, the re-wandering determiner 30 searches a database for an object identical to the detected object so as to determine whether the detected object re-wanders. Ultimately, the information provider 40 provides information about re-wandering of the detected object according to results of the determination.

The re-wandering detecting system includes the database. The database may be included in the re-wandering detecting device 1 or connected to the re-wandering detecting device 1 by a wired or wireless communication method.

The object detector 10 detects objects and information about the positions of the objects.

Figure 2:
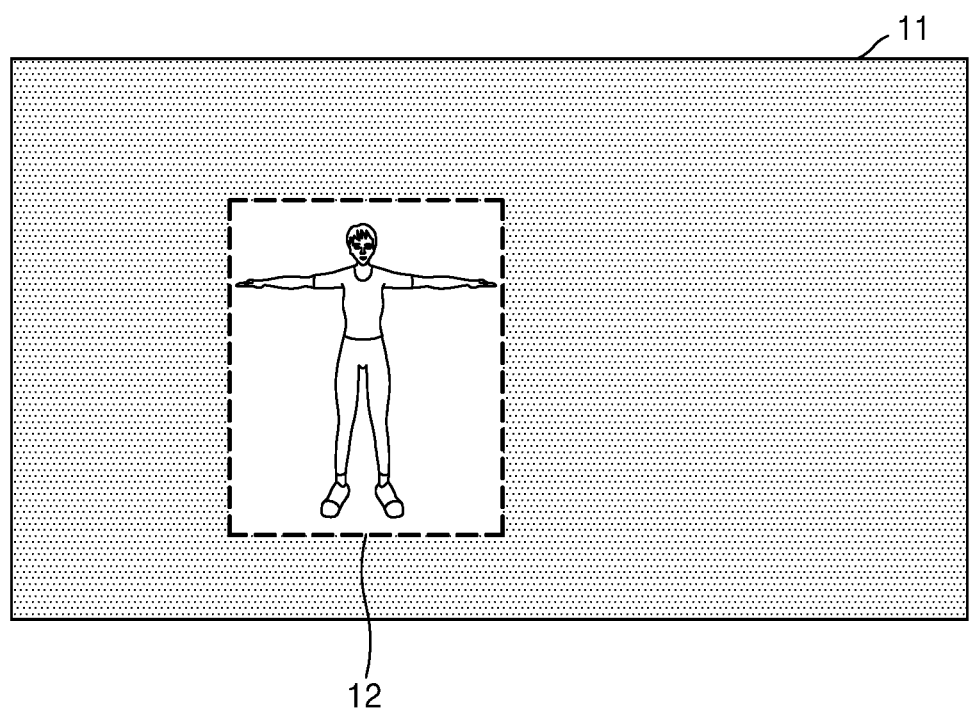
FIGS. 2 and 3 are views illustrating how an object detector detects an object and information about the position of the object from an input image, according to exemplary embodiments.
Figure 3:
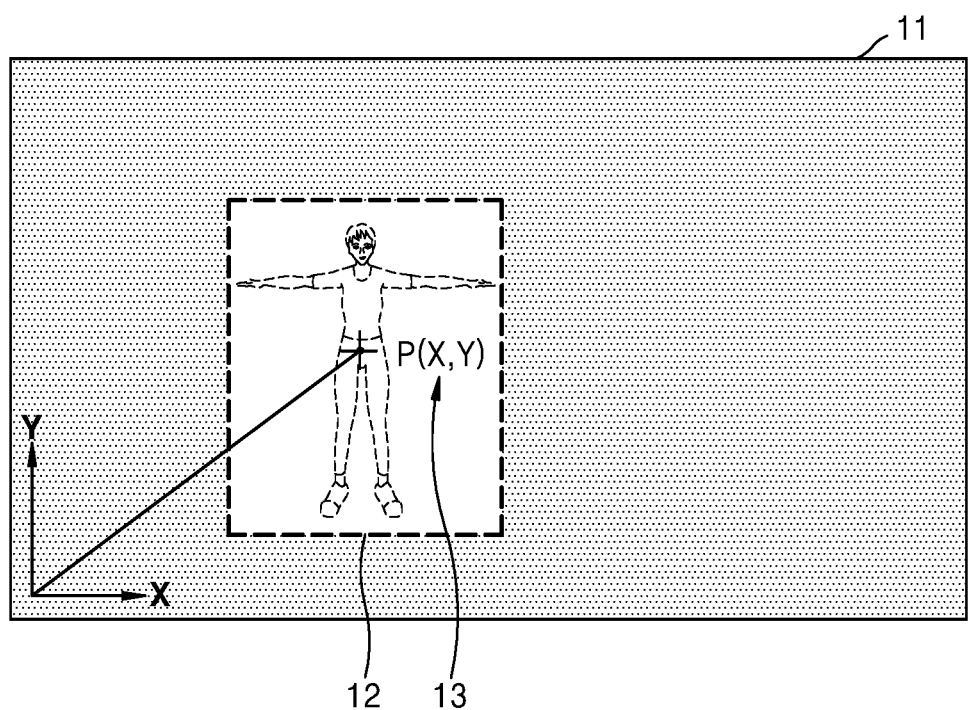

FIGS. 2 and 3 are views illustrating how the object detector 10 detects an object and information about the position of the object from an input image.

Referring to FIG. 2, the object detector 10 detects an object 12 from an input image 11.

The input image 11 may be a motion picture including a plurality of frames. In this case, the input image 11 may be one of the plurality of frames.

The object detector 10 may detect the object 12 by a method of detecting a motion area from the input image 11. Any motion area detecting method may be used without limitations. For example, a Gaussian Mixture Model (GMM) or a codebook model method may be used.

Referring to FIG. 3, the object detector 10 detects information 13 about the position of the object 12 from the input image 11. A center point or any other point of the object 12 may be detected as the position of the object 12. In addition, a user may set any point as an origin used for calculating the position of the object 12.

The object detector 10 may detect the object 12 and information 13 about the position of the object 12 from each of the plurality of frames.

Referring back to FIG. 1, the wandering determiner 20 determines whether the object 12 wanders based on the information 13 about the position of the object 12.

For example, if the object 12 detected by the object detector 10 satisfies a preset wandering condition, the wandering determiner 20 may determine that the object 12 wanders.

The wandering condition may be set by a user. For example, if the number of consecutive frames from which the object 12 is detected is equal to or greater than a preset critical number, it may be determined that the object 12 wanders. For this condition, however, the frames from of which the number is counted with respect to the object 12 do not have to be consecutive frames, and instead, these frames may be frames from which the object 12 is detected in a preset time period, according to another example. As still another example, a path along which the object 12 moves may be calculated based on the information 13 about the position of the object 12 detected by the object detector 10, and if the path forms at least one closed curve, it may be determined that the object 12 wanders.

Figure 4:
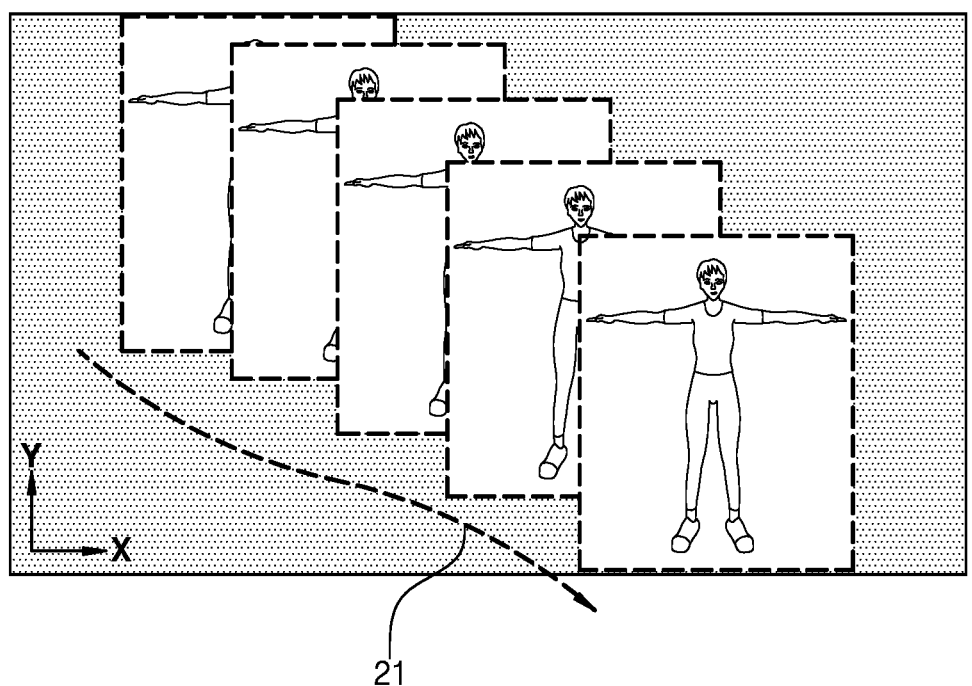
FIGS. 4 and 5 are views illustrating examples of a wandering condition that a wandering determiner may use.
Figure 5:
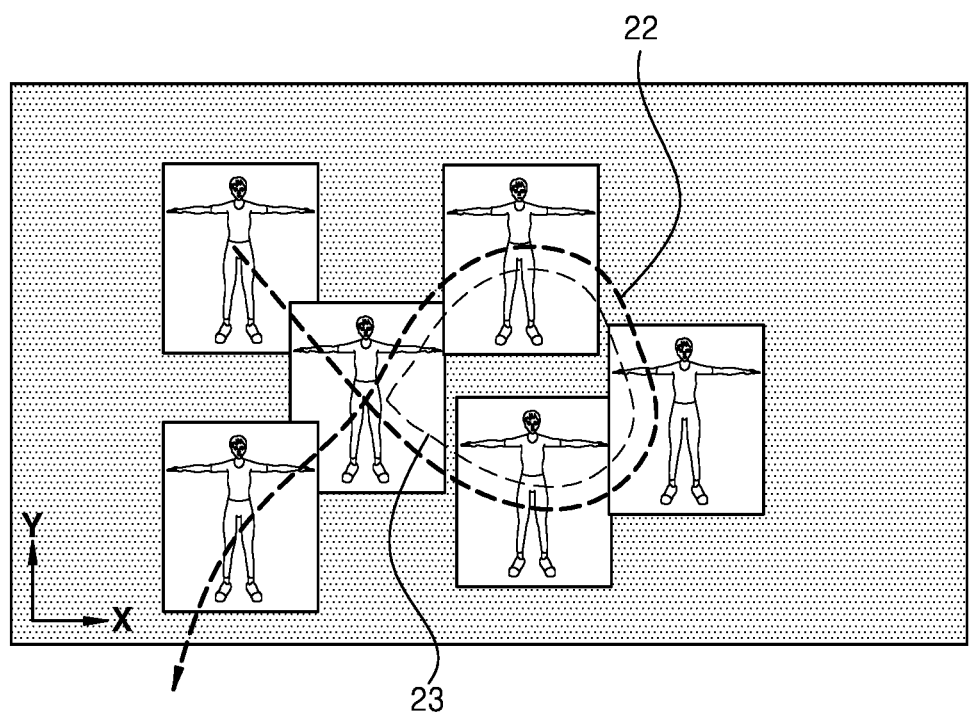

FIGS. 4 and 5 are views illustrating examples of the wandering condition that the wandering determiner 20 may use.

Referring to FIG. 4, it is assumed that the object 12 moves in a direction 21 from a left-upper position to a right-lower position of the input image 11, and the object 12 is detected from five consecutive frames. If a critical number used as a reference for wandering determination is four, since the object 12 is detected from five consecutive frames as shown in FIG. 4, the wandering determiner 20 may determine that the object 12 wanders.

Referring to FIG. 5, it is assumed that the object 12 moves along a path 22 sequentially through a left-upper position, a center-lower position, a center-upper position, and a left-lower position of the input image 11, and the path 22 forms a closed curve 23. That is, since the path 22 forms at least one closed curve 23, it may be determined that the object 12 wanders. In addition, although the wandering condition (critical number=4) described with reference to FIG. 4 is used to determine whether the object 12 shown in FIG. 5 wanders, it is determined that the objected 12 wanders.

If the wandering determiner 20 determines that the object 12 wanders, the object detector 10 further detects reference characteristics of the object 12 from at least one of the plurality of frames. The reference characteristics are used by the re-wandering determiner 30 to determine whether the object 12 re-wanders (described later).

Referring back to FIG. 1, if the wandering determiner 20 determines that the object 12 wanders, the re-wandering determiner 30 determines whether the database stores an object identical to the object 12 detected from the input image 11 so as to determine whether the object 12 re-wanders.

Figure 6:
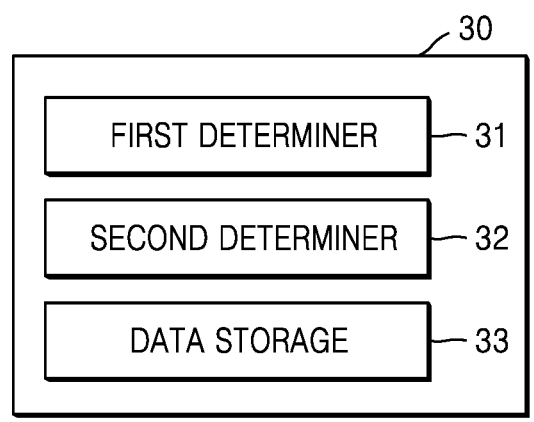
FIG. 6 is a view illustrating a re-wandering determinator, according to an exemplary embodiment.

Referring to FIG. 6, the re-wandering determiner 30 includes a first determiner 31, a second determiner 32, and a data storage 33. The first determiner 31 searches the database to determine whether the database stores an object having the same reference characteristics as the reference characteristics of the object 12 detected by the object detector 10 after the object 12 is determined as a wandering object. If the database stores an object having the same reference characteristics as the reference characteristics of the object 12, the second determiner 32 determines that the object 12 detected by the object detector 10 re-wanders. If the object 12 detected by the object detector 10 is determined as a re-wandering object, the data storage 33 stores images of the object 12 detected respectively from the plurality of frames in the database, and if the object 12 detected by the object detector 10 is not determined as a re-wandering object, the data storage 33 stores the reference characteristics of the object 12 and the images of the object 12 detected respectively from the plurality of frames in the database. In this case, the reference characteristics may include one or a combination of a clothing, face, and gait of the object 12.

Figure 7:
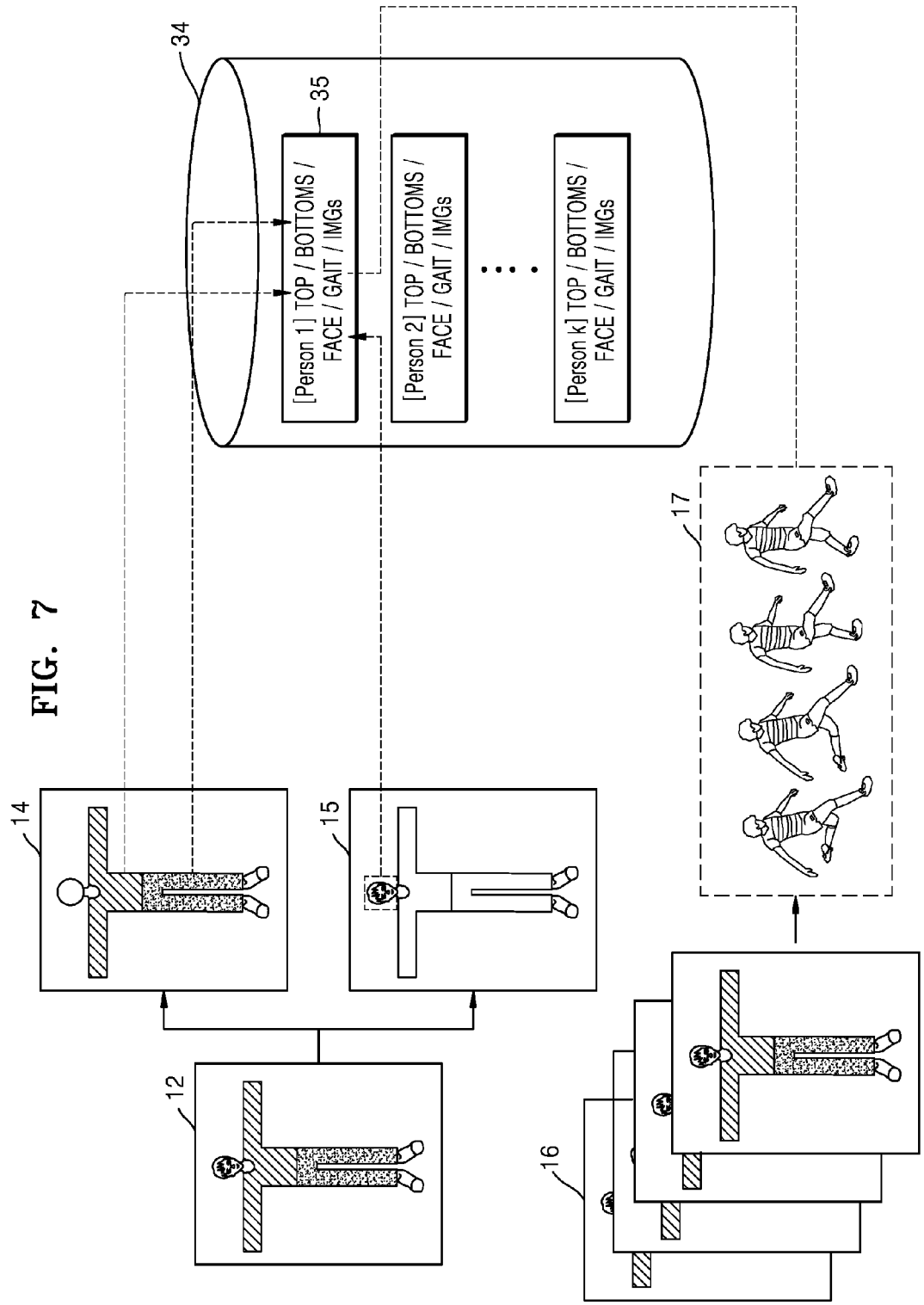
FIG. 7 is a view illustrating a process of storing images of an object detected by the object detector in a database, according to an exemplary embodiment.

FIG. 7 is a view illustrating a process of storing reference characteristics of an object 12 and images of the object 12 taken from a plurality of frames 16 in a database 34 when it is determined that the object 12 detected by the object detector 10 does not wander.

As described above, if the wandering determiner 20 determines that the object 12 wanders, the object detector 10 further detects reference characteristics of the object 12 from at least one of a plurality of frames 16.

The data storage 33 stores clothing characteristics 14 of the object 12 detected from one of the plurality of frames 16 by the object detector 10 in a section 35 of the database 34. Similarly, the data storage 33 may store face characteristics 15 of the object 12 detected from one of the plurality of frames 16 by the object detector 10 in the section 35 of the database 34. A method of extracting clothing or face characteristics is not limited. That is, any method may be used.

In addition, the data storage 33 may store gait characteristics 17 of the object 12 detected from the plurality of frames 16 by the object detector 10 in the section 35 of the database 34.

In addition to the reference characteristics of the object 12, images of the object 12 (or patterns/box images of the object 12) detected from the plurality of frames 16 may be stored in the section 35 of the database 34.

The reference characteristics such as the clothing characteristics 14, the face characteristics 15, and the gait characteristics 17, and the images of the object 12 stored in the database 34 are used in a re-wandering determination process to determine whether the database 34 stores an object having the same reference characteristics as the reference characteristics of the object 12.

In another exemplary embodiment, the object detector 10 may detect box images of the object 12 and information about the positions of the box images from the plurality of frames 16. That is, the object detector 10 may detect the object 12 in the form of box images. The object detector 10 may further detect reference characteristics of the box images from at least one of the frames 16. If it is determined that the database 34 does not stores an object having the same reference characteristics as the reference characteristics of the box images, the data storage 33 stores the reference characteristics and the box images detected form the plurality of frames 16. However, if the database 34 stores an object having the same reference characteristics as the reference characteristics of the box images, the object 12 is determined as a re-wandering object, and the data storage 33 stores the box images detected from the plurality of frames 16 in the database 34.

Referring back to FIG. 1, the information provider 40 provides wandering information about the object 12 according to whether the object 12 re-wanders. That is, if the object 12 has a record of wandering and re-wandering, that is, wanders again, the information provider 40 may further provide information about previous wandering of the object 12 unlike the case in which the object 12 does not have a record of wandering. That is, the information provider 40 may provide information about current wandering of the object 12 and information about previous wandering of the object 12 to a user. Then, the user may make a decision more accurately by comparing the information about the current wandering of the object 12 with the information about the previous wandering of the object 12.

For example, the information provider 40 include a first information provider providing information about current wandering and a second information provider providing information about previous wandering. If it is determined that the object 12 wanders, the first information provider arranges all images of the object 12 detected by the object detector 10 in a single screen with reference to the information 13 about the position of the object 12. In this manner, the first information provider provides information about wandering of the object 12.

The second information provider provides other images of the object 12 stored in the database 34 than the images provided by the first information provider. At this time, the second information provider provides the images with reference to information about the positions of the images. Since the re-wandering determiner 30 stores all images of the object 12 in the database 34, the images of the object 12 provided by the first information provider are excluded so as not to provide the same information. The information provider 40 provides information about re-wandering by arranging information provided by the first information provider and information provided by the second information provider in a single screen. At this time, the information provider 40 may provide additional information such as wandering times in addition to the information provided by the first and second information providers.

Figure 8:
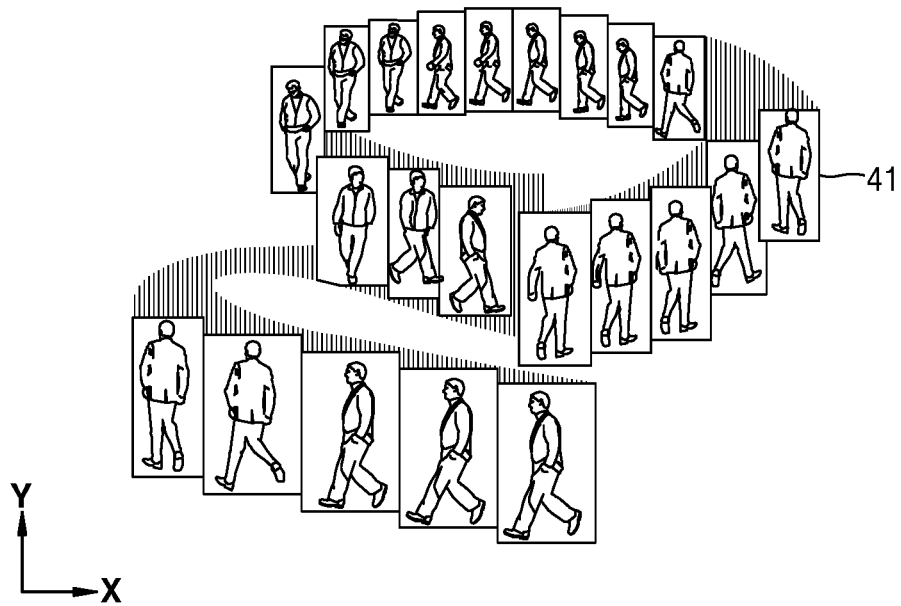

FIGS. 8 and 9 illustrate examples of a screen through which the information provider 40 provides information about wandering.

FIG. 8 is a view illustrating an example in which the first information provider provides information about current wandering. With reference to the information 13 about the position of the object 12 determined as a wandering object, the first information provider provides all images 41 (information about current wandering) of the object 12 detected by the object detector 10 in a single screen. In this manner, the first information provider provides information about wandering.

FIG. 9 is a view illustrating an example in which the second information provider provides information about re-wandering. The second information provider provides images 42 of the object 12 stored in the database 34 except for the images 41 provided by the first information provider. At this time, the second information provider provides the images 42 with reference to information about the positions of the images 42.

In addition, the information provider 40 may provide additional information 43 such as wandering times in addition to the information provided by the first and second information providers.

According to another exemplary embodiment, the information provider 40 may provide information about wandering by arranging all box images of the object 12 detected by the object detector 10 in the single screen with reference to information about the positions of the box images.

The second information provider may provide box images of the object stored in the database 34 except for the box images provided by the first information provider. At this time, the second information provider provides the box images with reference to information about the positions of the box images. At this time, the second information provider may provide information in the single screen together with information provided by the first information provider. In this manner, the second information provider may provide information about re-wandering.

In another exemplary embodiment, if it is determined that the object 12 re-wanders, the information provider 40 may provide information about re-wandering by displaying all images of the object 12 stored in the database 34 one by one in a time sequence with reference to information about the images and the position of the object 12 stored in the database 34.

Figure 10B:
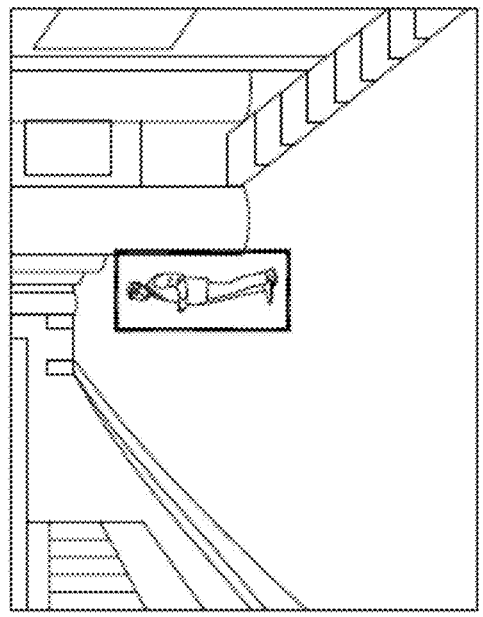
FIGS. 10A and 10B are views illustrating examples of a screen through which the information provider provides information about wandering according to another embodiment.
Figure 10A:
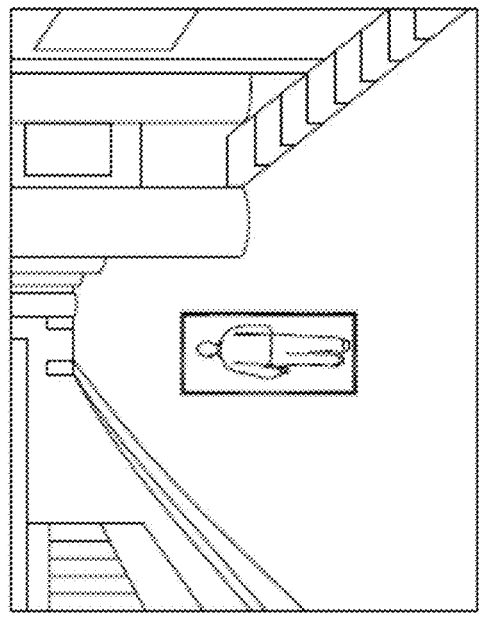

FIGS. 10A and 10B illustrate examples of a screen through which the information provider 40 provides information about wandering according to another exemplary embodiment. The information provider 40 may continuously display frames on a screen as shown in FIGS. 10*a* and 10B and then the next frames on the screen. In this manner, the information provider 40 may display images of the object 12 stored in the database 34 one by one in a time sequence with reference to information about the positions of the images. FIG. 10A illustrates an example in which a particular frame is displayed on the screen, and FIG. 10B illustrates an example which the next frame is displayed on the screen.

In addition, as described above, the information provider 40 may further provide additional information such as the wandering time together with the images of the object 12.

Figure 11:
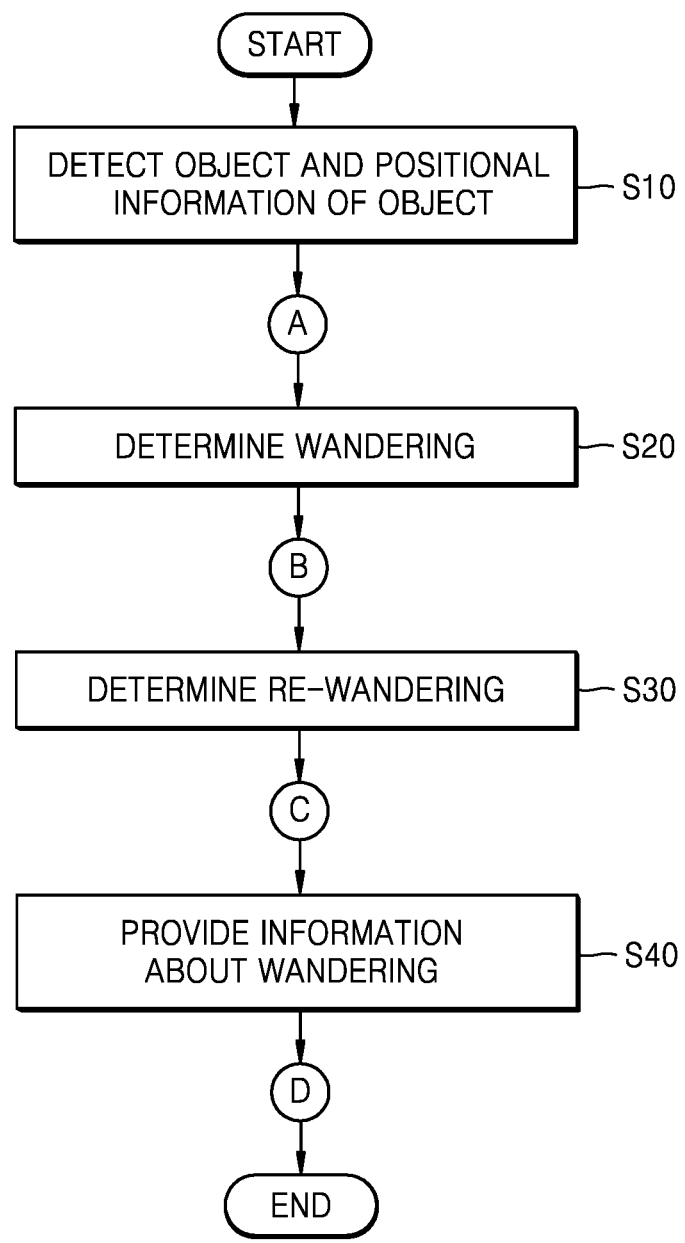
FIG. 11 is a flowchart illustrating a method of detecting re-wandering according to an exemplary embodiment.

FIG. 11 is a flowchart illustrating a method of detecting re-wandering, and the method may be performed using the re-wandering detecting system shown in FIG. 1. The same descriptions as those given above with reference to FIGS. 1 to 10 will not be repeated here.

The object detector 10 detects an object 12 and information 13 about the position of the object 12 from an input image 11 (S10). The object 12 may be detected in various forms by various methods. For example, the object 12 may be detected in the form of box images by a motion detection method. The detected object 12 is the subject of a wandering determination operation and a re-wandering determination operation (described later). The information 13 about the position of the object 12 is used in the wandering determination operation and an operation of providing information about wandering to a user (described later).

The wandering determiner 20 determines whether the object 12 wanders based on the information 13 about the position of the object 12 (S20). For example, when a path along which the object 12 moves is calculated using the information 13 about the position of the object 12, if the path forms at least one closed curve, it is determined that the object 12 wanders. As another example, if the number of consecutive frames from which the object 12 is detected is equal to or greater than a preset critical number, it may be determined that the object 12 wanders.

If the wandering determiner 20 determines that the object 12 wanders, the object detector 10 further detects reference characteristics of the object 12 from at least one of a plurality of frames. The reference characteristics are used by the re-wandering determiner 30 to determine whether the object 12 re-wanders (described later).

If the wandering determiner 20 determines that the object 12 wanders, the re-wandering determiner 30 determines whether the database 34 stores an object identical to the object 12 to determine whether the object 12 re-wanders (S30). At this time, if an object having the same reference characteristics as the reference characteristics of the object 12 is found from the database 34, it is determined that the database 34 stores an object identical to the object 12. The reference characteristics may be clothing characteristics, face characteristics and/or gait characteristics.

Finally, the information provider 40 provides wandering information about the object 12 differently according to whether the object 12 re-wanders (S40). For example, if the object 12 is determined as a re-wandering object, all images of the object 12 relating to current wandering and all images of the object 12 relating to previous wandering may be displayed in a screen, preferably but not necessarily a single screen, so that the images may be compared with one another. In addition, time information may be further provided for more efficient management and surveillance.

Figure 12:
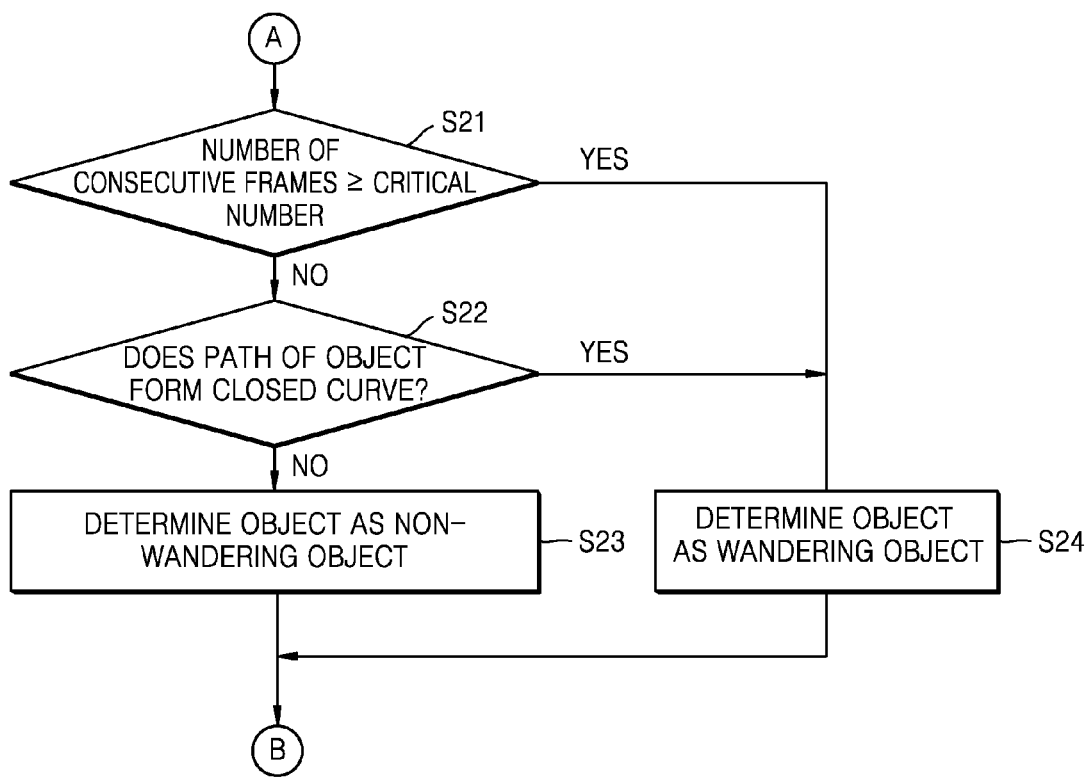
FIG. 12 is a detailed flowchart illustrating a process S20 shown in FIG. 11, according to an exemplary embodiment.

FIG. 12 is a detailed flowchart illustrating operation S20 shown in FIG. 11. If the object 12 satisfies a preset wandering condition, the wandering determiner 20 determines that the object 12 wanders. For example, if the number of consecutive frames from which the object 12 is detected is equal to or greater than a preset critical number (S21), or at least one closed curve is formed by a path along which the object 12 moves (S22), the wandering determiner 20 may determine that the object 12 wanders (S24). If the object 12 does not satisfy any of the above-mentioned wandering conditions, it is determined that the object 12 does not wander (S23). If the wandering determiner 20 determines that the object 12 wanders, the object detector 10 further detects reference characteristics of the object 12 from at least one of the plurality of frames.

Figure 13:
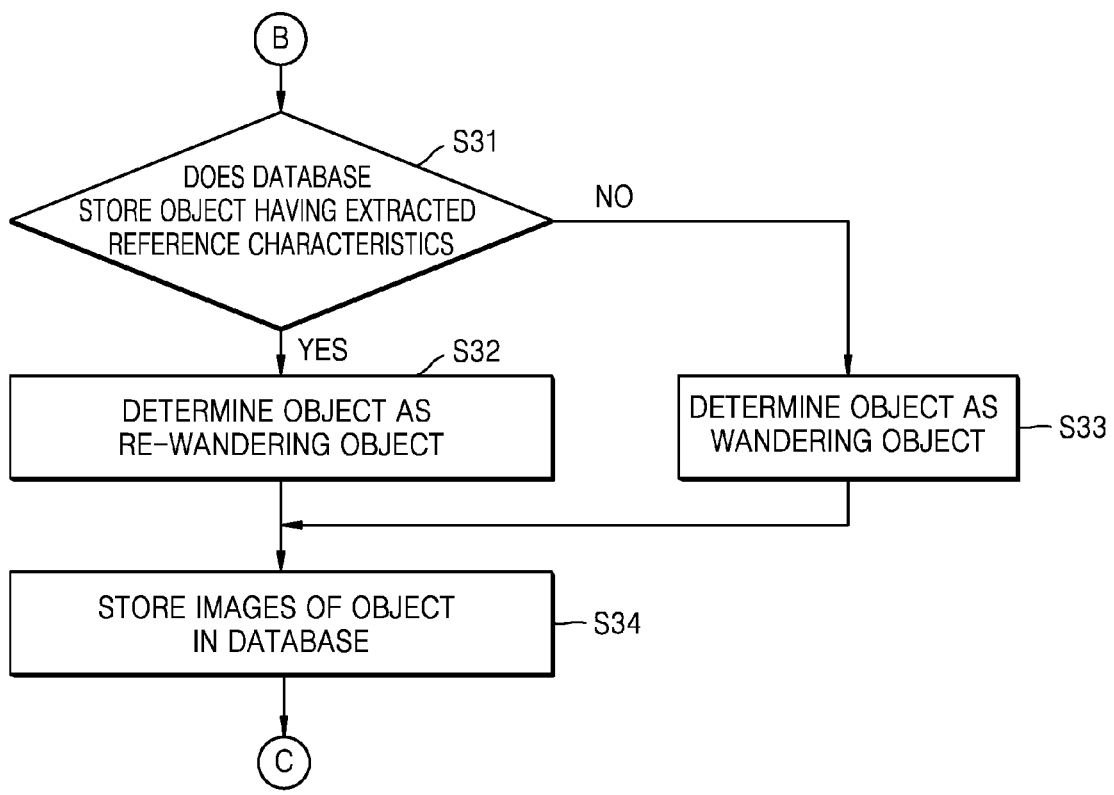
FIG. 13 is a detailed flowchart illustrating a process S30 shown in FIG. 11, according to an exemplary embodiment.

FIG. 13 is a detailed flowchart illustrating operation S30 shown in FIG. 11. If the wandering determiner 20 determines that the object 12 wanders, the re-wandering determiner 30 determines whether the database 34 stores an object identical to the object 12 detected from the input image 11 to determine whether the object 12 re-wanders.

For example, the re-wandering determiner 30 searches the database 34 to determine whether the database 34 stores an object having the same reference characteristics as reference characteristics of the object 12 detected by the object detector 10 (S31). If the database 34 stores an object having the same reference characteristics as the reference characteristics of the object 12, the re-wandering determiner 30 determines that the object 12 re-wanders (S32). However, if the database 34 does not store an object having the same reference characteristics as the reference characteristics of the object 12, the reference characteristics of the object 12 are stored in the database 34 (S33). Finally, the re-wandering determiner 30 stores images of the object 12 detected from the plurality of frames in the database 34 (S34).

At this time, in the case in which the object 12 is determined as a re-wandering object, the images of the object 12 detected from the plurality of frames are stored in the database 34 in addition to information about the object 12 already stored in the database 34. However, in the case in which the object 12 is not determined as a re-wandering object, the images of the object 12 detected from the plurality of frames are stored in the database 34 together with the reference characteristics of the object 12.

Figure 14:
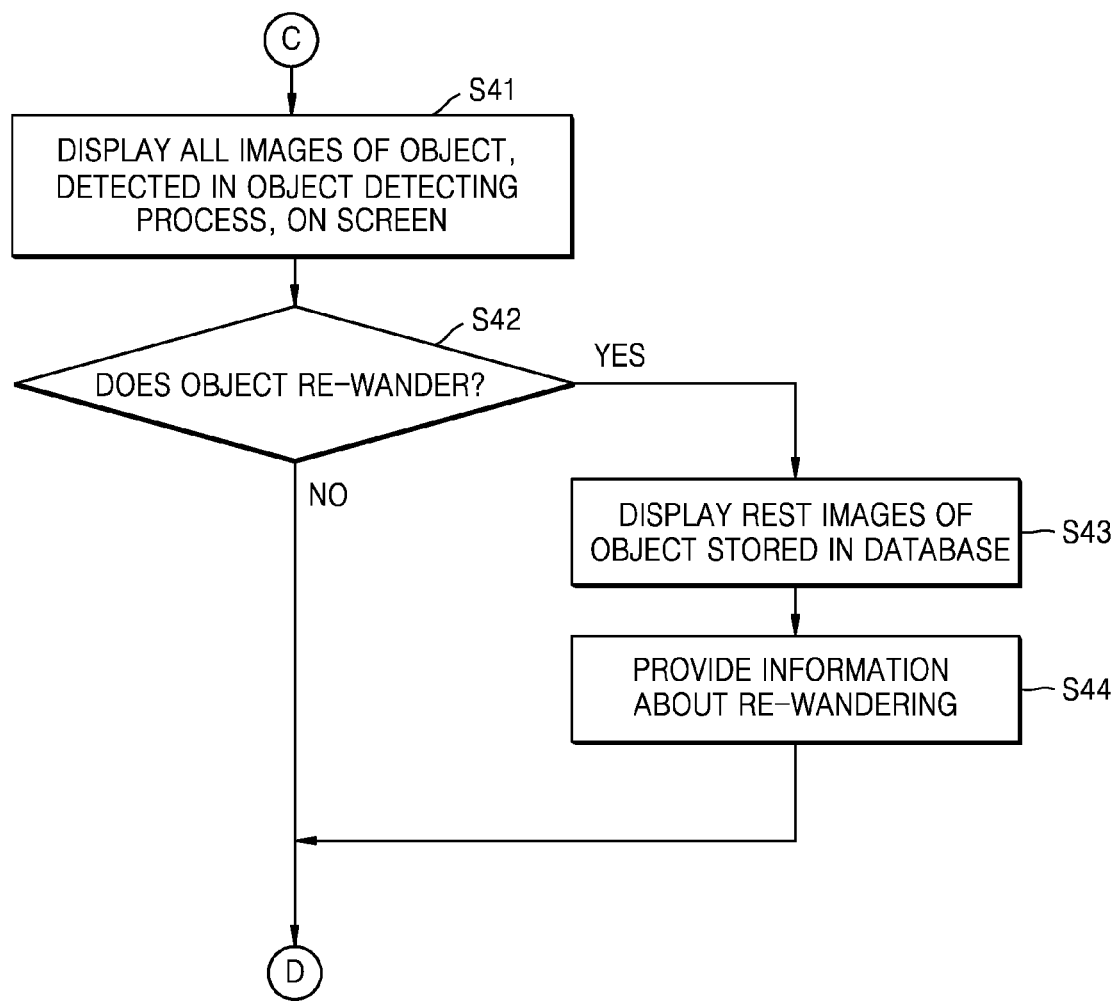
FIG. 14 is a detailed flowchart illustrating a process S40 shown in FIG. 11, according to an exemplary embodiment.

FIG. 14 is a detailed flowchart illustrating operation S40 shown in FIG. 11. The information provider 40 provides wandering information about the object 12 differently according to whether the object 12 re-wanders. That is, if the object 12 has a record of wandering and wanders again, the information provider 40 may further provide information about previous wandering of the object 12 unlike the case in which the object 12 does not have a record of wandering. That is, the information provider 40 may provide information about current wandering and information previous wandering of the object 12 to a user.

For example, if it is determined that the object 12 wanders, the information provider 40 provides all the images of the object 12 detected by the object detector 10 in a single screen with reference to the information 13 about the position of the object 12 to provide information about wandering (current wandering) of the object 12 (S41). The information provider 40 determines whether the object 12 re-wanders (S42). If it is determined that the object 12 re-wanders, the information provider 40 provides images of the object 12 stored in the database 34 except for the images provided in operation S41 with reference to information about the positions of the images (S43). At this time, additional information such as the wandering time may be provided in addition to the information provided in operations S41 and S43 (S44).

Unlike wandering alarm systems of the related art configured to determine whether an object wanders based on a time period during which the objects appears, according to the above exemplary embodiments, reference characteristics are extracted, and information about the number of times of wandering is provided. Therefore, surveillance and monitoring may be carried out more effectively.

The inventive concept described in the above exemplary embodiments may be applied to various systems for recognizing and re-recognizing objects. For example, if the FOVs of a plurality of cameras of a surveillance system are combined as one FOV, wandering objects may be detected more accurately from a wider region.

In addition, the inventive concept may be applied to any system for accurate counting. For example, all objects entering and exiting an FOV may be detected and stored in the database 34, and objects repeatedly passing through the FOV may not be recounted. Therefore, counting may be accurately performed.

If the inventive concept is applied to a surveillance system including a plurality of cameras, a path along which an object moves may be detected by recognizing and re-recognizing the object.

The re-wandering detecting device and method of the embodiments may also be embodied as computer readable codes on a computer readable recording medium. The computer readable recording medium is any data storage device that may store data which may be thereafter read by a computer system. Examples of the computer readable recording medium include read-only memory (ROM), random-access memory (RAM), CD-ROMs, magnetic tapes, floppy disks, and optical data storage. The computer readable recording medium may also be distributed over network coupled computer systems so that the computer readable code is stored and executed in a distributed fashion. Also, functional programs, codes, and code segments for accomplishing the inventive concept may be easily construed by programmers skilled in the art to which the inventive concept pertains.

According to the method and device of the above exemplary embodiments, it is possible to detect a wandering object, extract reference characteristics from the object, and provide information about the object on a screen differently according to the number of times of wandering of the object.

It should be understood that the exemplary embodiments described herein should be considered in a descriptive sense only and not for purposes of limitation. Descriptions of features or aspects within each exemplary embodiment should typically be considered as available for other similar features or aspects in other exemplary embodiments.

While one or more embodiments have been described with reference to the figures, it will be understood by those of ordinary skill in the art that various changes in form and details may be made therein without departing from the spirit and scope of the inventive concept as defined by the following claims.

What is claimed is:

1. A method of detecting re-wandering, the method comprising:
   detecting, by at least one processor, an object and positional information about the object from an input image;
   determining, by the processor, whether the object wanders based on the positional information about the object;
   in response to determining that the object wanders, determining whether the object re-wanders by determining whether a database stores information about an object identical to the object detected from the input image; and
   providing, by the processor, information about wandering of the object according to whether the object re-wanders,
   wherein the information is provided differently in accordance with a number of times of wandering by the object.

2. The method of claim 1, wherein the input image is a motion picture comprising a plurality of frames,
   wherein the detecting the object comprises detecting the object and positional information about the object from each of the plurality of frames, and
   wherein, in the determining whether the object wanders, the object is determined as a wandering object if the object satisfies a preset wandering condition.

3. The method of claim 2, wherein the wandering condition is that a number of consecutive frames from which the object is detected is equal to or greater than a preset critical number.

4. The method of claim 1, wherein the input image is a motion picture comprising a plurality of frames,
   wherein the detecting the object comprises detecting the object and positional information about the object from each of the plurality of frames and detecting reference characteristics of the object from at least one of the plurality of frames, and
   wherein the determining whether the object re-wanders comprises:
   searching the database to determine whether the database stores information about an object having the same reference characteristics as the detected reference characteristics of the object and determine that the object re-wanders if the database stores the information about the object having the same reference characteristics as the detected reference characteristics;
   in response to determining that the object re-wanders, storing images of the object respectively detected from the plurality of frames in the database; and
   in response to determining that the object does not re-wander, storing the detected reference characteristics of the object and the images of the object respectively detected from the plurality of frames in the database.

5. The method of claim 4, wherein the detecting the object comprises detecting box images of the object and positional information about the box images respectively from the plurality of frames and detecting reference characteristics of the box images from at least one of the plurality of frames, and
   wherein, in response to determining that the database does not store the information about the object having the same reference characteristics as the detected reference characteristics of the box images, the reference characteristics of the box images and all the box images respectively detected from the plurality of frames are stored in the database.

6. The method of claim 4, wherein the reference characteristics of the object comprise clothing characteristics, face characteristics, gait characteristics, or a combination thereof.

7. The method of claim 1, wherein the input image is a motion picture comprising a plurality of frames,
   wherein the detecting the object comprises detecting the object and positional information about the object from each of the plurality of frames, and
   wherein the providing the information comprises:
   in response to determining that the object wanders, providing primary information about the wandering of the object by arranging all images of the object detected in the detecting the object in a single screen with reference to the positional information about the object; and
   in response to determining that the object re-wanders in the determining whether the object re-wanders, providing secondary information about the re-wandering of the object by selecting other images of the object stored in the database than the images provided in the providing the primary information and arranging the selected images in the single screen together with the information provided in the providing the primary information with reference to positional information about the object in the selected images.

8. The method of claim 7, wherein the detecting the object comprises detecting box images of the object and positional information about the box images respectively from the plurality of frames,
   wherein the database previously stores box images of a plurality of objects and positional information about the box images of the objects,
   wherein the providing the primary information comprises providing information about the wandering of the object by arranging all the box images of the object detected in the detecting the object in the single screen with reference to the positional information about the object in the box images, and
   wherein the providing the secondary information comprises providing information about the re-wandering of the object by selecting other box images of the object stored in the database than the box images provided in the providing the primary information and arranging the selected box images in the single screen together with the information provided in the providing the primary information with reference to positional information about the object in the selected box images.

9. The method of claim 1, wherein in response to determining that the object re-wanders in the determining whether the object re-wanders, the providing the information comprises displaying all images of the object stored in the database in a screen one by one in a time sequence with reference to information about the images of the object and a position of the object stored in the database.

10. A re-wandering detecting device comprising at least one processor to implement:
- an object detector configured to detect an object and positional information about the object from an input image;
- a first wandering determiner configured to determine whether the object wanders based on the positional information about the object;
- a re-wandering determiner, in response to determining by the first wandering determiner that the object wanders, configured to determine whether the object has wandered more than one time by determining whether a database stores information about an object identical to the object detected from the input image; and
- an information provider configured to provide information about wandering of the object when the object wanders one time, and differently provide information about wandering of the object when the object wanders more than one time.

11. The re-wandering detecting device of claim 10, wherein the input image is a motion picture comprising a plurality of frames,
- wherein the object detector detects the object and positional information about the object from each of the plurality of frames, and
- wherein if the object detected by the object detector satisfies a preset wandering condition, the first wandering determiner determines that the object wanders.

12. The re-wandering detecting device of claim 11, wherein the wandering condition is that a number of consecutive frames from which the object is detected is equal to or greater than a preset critical number.

13. The re-wandering detecting device of claim 11, wherein the wandering condition is that at least one closed curve is formed by a path of the object calculated using the positional information about the object.

14. The re-wandering detecting device of claim 10, wherein the input image is a motion picture comprising a plurality of frames,
- wherein the object detector detects the object and positional information about the object from each of the plurality of frames and detects reference characteristics of the object from at least one of the plurality of frames,
- wherein the re-wandering determiner comprises:
- a first determiner configured to search the database for the detected reference characteristics and determine whether the database stores information about an object having the same reference characteristics as the detected reference characteristics of the object;
- a second determiner configured to determine the object as a re-wandering object in response to determining by the first determiner that the database stores the object having the same reference characteristics as the detected reference characteristics of the object; and
- a data storage, in response to determining by the second determiner that the object is a re-wandering object, configured to store images of the object respectively detected from the plurality of frames in the database, and, in response to determining by the second determiner that the object is not the re-wandering object, configured to store the reference characteristics of the object and the images of the object respectively detected from the plurality of frames in the database.

15. The re-wandering detecting device of claim 14, wherein the object detector detects box images of the object and positional information about the box images respectively from the plurality of frames, and detects reference characteristics of the box images from at least one of the plurality of frames, and
- wherein, in response to determining by the second determiner that the database does not store the information about the object having the same reference characteristics as the detected reference characteristics of the box images, the data storage stores the reference characteristics of the box images and all the box images respectively detected from the plurality of frames in the database.

16. The re-wandering detecting device claim 14, wherein the reference characteristics of the object comprise clothing characteristics, face characteristics, gait characteristics, or a combination thereof.

17. The re-wandering detecting device of claim 10, wherein the input image is a motion picture comprising a plurality of frames,
- wherein the object detector detects the object and positional information about the object from each of the plurality of frames, and
- wherein the information provider comprises:
- a first information provider, in response to determining by the first wandering determiner that the object wanders, configured to provide information about the wandering of the object by arranging all images of the object detected by the object detector in a single screen with reference to the positional information about the object; and
- a second information provider, in response to determining by the re-wandering determiner that the object re-wanders, configured to provide information about the re-wandering of the object by selecting other images of the object stored in the database than the images provided by the first information provider and arranging the selected images in the single screen together with the information provided by the first information provider with reference to positional information about the object in the selected images.

18. The re-wandering detecting device of claim 17, wherein the object detector detects box images of the object and positional information about the box images respectively from the plurality of frames,
- wherein the database previously stores box images of a plurality of objects and positional information about the box images of the objects,
- wherein the first information provider provides information about the wandering of the object by arranging all the box images of the object detected by the object detector in the single screen with reference to the positional information about the object in the box images, and
- wherein the second information provider provides information about the re-wandering of the object by selecting other box images of the object stored in the database than the box images provided by the first information provider and arranging the selected box images in the single screen together with the information provided by the first information provider with reference to positional information about the object in the selected box images.

19. A method of detecting re-wandering, the method comprising:
- detecting, by at least one processor, an object and positional information about the object from an input image;

determining, by the processor, whether the object wanders based on the positional information about the object;

in response to determining that the object wanders, determining whether the object re-wanders by determining whether a database stores information about an object identical to the object detected from the input image; and providing, by the processor, information about wandering of the object according to whether the object re-wanders, wherein the input image is a motion picture comprising a plurality of frames, wherein the detecting the object comprises detecting the object and positional information about the object from each of the plurality of frames, and wherein, in the determining whether the object wanders, the object is determined as a wandering object if the object satisfies a preset wandering condition, wherein the wandering condition is that at least one closed curve is formed by a path of the object calculated using the positional information about the object.

20. A method of detecting re-wandering, the method comprising:

detecting, by at least one processor, an object and positional information about the object from an input image;

determining, by the processor, whether the object wanders based on the positional information about the object;

in response to determining that the object wanders, determining whether the object re-wanders by determining whether a database stores information about an object identical to the object detected from the input image; and providing, by the processor, information about wandering of the object according to whether the object re-wanders, wherein the information is provided differently in accordance with a number of times of wandering by the object, wherein the detecting the object comprises detecting the object and positional information about the object from each of a plurality of frames, and wherein in response to determining that the object re-wanders, the providing the information comprises displaying images of the object detected in the detecting the object together with other images of the object stored in the database on a screen with reference to the positional information about the object.

* * * * *